(12) United States Patent
Branagan

(10) Patent No.: US 6,746,152 B2
(45) Date of Patent: Jun. 8, 2004

(54) THRUST BEARING AND METHOD FOR EQUALIZING LOAD

(75) Inventor: Lyle Arthur Branagan, Gastonia, NC (US)

(73) Assignee: Pioneer Motor Bearing Company, Kings Mountain, NC (US)

( * ) Notice: Subject to any disclaimer, the term of this patent is extended or adjusted under 35 U.S.C. 154(b) by 0 days.

(21) Appl. No.: 09/916,383

(22) Filed: Jul. 27, 2001

(65) Prior Publication Data

US 2003/0021503 A1 Jan. 30, 2003

(51) Int. Cl.$^7$ ................................................ F16C 32/06
(52) U.S. Cl. ........................................ 384/122; 384/307
(58) Field of Search ................................ 384/122, 112, 384/307, 306, 308

(56) References Cited

U.S. PATENT DOCUMENTS

| | | | |
|---|---|---|---|
| 3,549,215 A | | 12/1970 | Hollingsworth |
| 3,768,377 A | * | 10/1973 | Engel et al. ............... 384/307 |
| 3,982,796 A | | 9/1976 | Hill |
| 4,059,318 A | | 11/1977 | Hollingsworth |
| 4,099,802 A | * | 7/1978 | Heinemann et al. ........ 384/122 |
| 4,106,824 A | * | 8/1978 | Meystre et al. ............. 384/122 |
| 4,544,285 A | | 10/1985 | Shapiro |
| 6,050,727 A | | 4/2000 | Messmer et al. |

OTHER PUBLICATIONS

"Providing Solutions to Manufacturers and Users of Rotating Equipment," South San Francisco, 2000.
Pioneer Motor Bearing Co., "Fluid Pivot Journal Bearings," South San Francisco, undated.

* cited by examiner

Primary Examiner—Lenard A. Footland
(74) Attorney, Agent, or Firm—Womble Carlyle Sandridge & Rice, PLLC; Craig H. Popalis

(57) ABSTRACT

A multi-pad, fluid film thrust bearing has the pads suspended from the carrier ring on hydrostatic oil pressure regions. The oil is pressurized hydrodynamically by relative rotation between a load surface and the bearing surface of each pad; and the oil is passed through each pad to a rear cavity where the hydrostatic pressure region is established. A manifold interconnects all of the hydrostatic pressure regions for the individual pads in order to average the hydrostatic pressures and provide for static and dynamic load equalization.

24 Claims, 10 Drawing Sheets

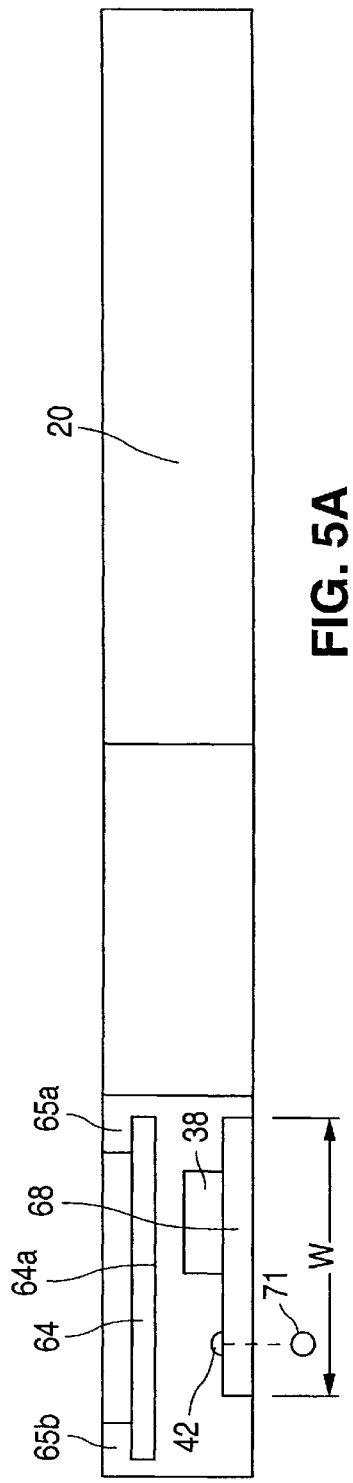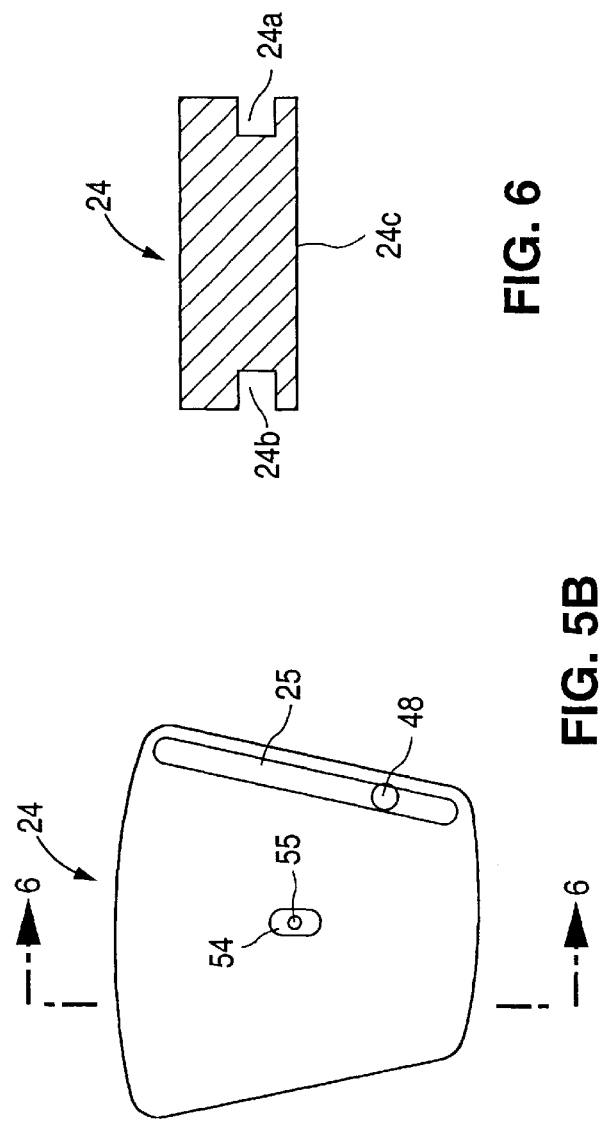

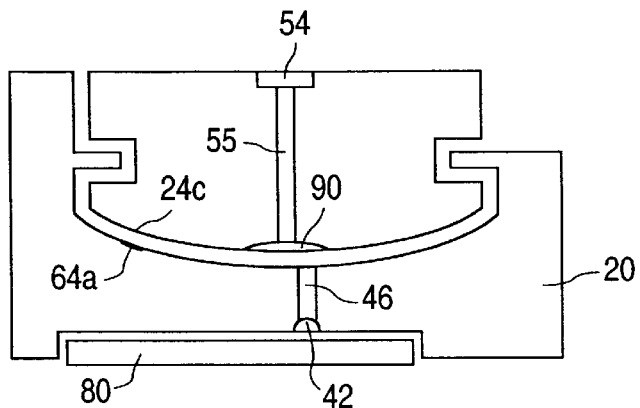
FIG. 14
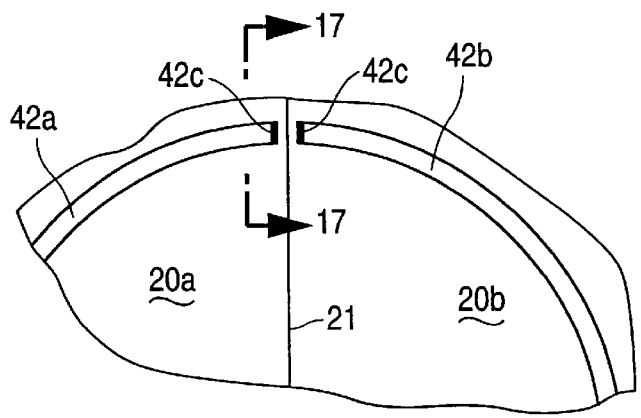
FIG. 15
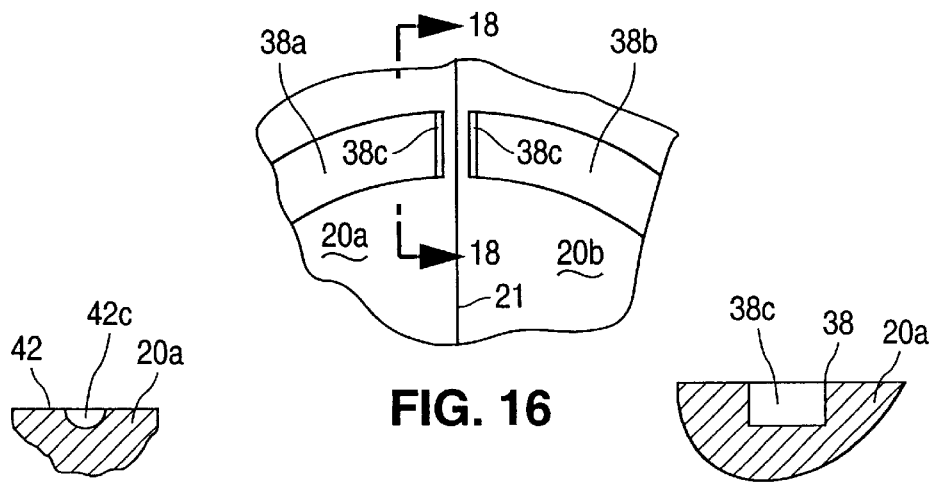
FIG. 16
FIG. 17
FIG. 18

THRUST BEARING AND METHOD FOR EQUALIZING LOAD

BACKGROUND OF THE INVENTION

1. Field of the Invention

The present invention relates to thrust bearings. More particularly, the present invention provides a thrust bearing of the type comprising a pad carrier coupled to an annular series of discrete thrust pads having respective thrust bearing surfaces against which rotatably bears a co-operating annular bearing or load surface of a rotating member. More particularly further, the present invention also provides a method for equalizing a load on the thrust pads.

2. Description of the Prior Art

There is seen in FIG. 1 a prior art end-thrust bearing, generally illustrated as 10. The end-thrust bearing 10 includes a collar 12 supporting a plurality of stationary segments 14. The segments 14 in the actual bearing are pivoted in order to allow them to assume slightly different angles by which to create different degrees of convergence of respective oil films 16. The collar 12 is attached to a rotating member (not shown). Oil is introduced at the inner edges of the segments 14 so that the centrifugal action of the rotating member 19 causes the oil to flow radially outward, at the same time the oil adhering to the surface of the collar moves circumferentially and builds up pressure in the film. The wedge formation of the oil film 16 insures a complete separation of the metal parts. The prior art bearing 10 in FIG. 1 may be made in types suitable for vertical or horizontal shafts, for carrying thrusts in either or both longitudinal directions, and for the dissipation of large quantities of heat by fan or water cooling. Segments 14 are spaced around the periphery of the collar 12, and each segment 14 is supported so that it can tip to form the proper wedge shape for the oil film 16.

Thrust bearings, such as the one in FIG. 1, are presently imposed with high load and performance expectations because of increasing performance, price, and reliability demands for advanced machinery, such as modem high-speed compressors, gas turbines, steam turbines, gearboxes, and the like. Of the variety of fluid-film bearing designs employed to support thrust loads, tilting-pad designs offer the highest load capacity. Due to manufacturing tolerances, misalignment, shaft flexibility and related dynamic forces, equalization of the load carried by the individual pads is required to reliably obtain the maximum load capacity. The equalization of mechanically-pivoted thrust pads typically involves tight tolerancing, mechanical linkages, or flexible members, which introduce several disadvantages into the design. Tight tolerancing may add excessive cost to the pads and supporting hardware and is only an approximate means of equalization. Mechanical linkages require considerable axial space and are known to lock-up, ceasing to provide equalization under high loads or certain forms of dynamic loads. Furthermore, the contact points of the linkages are subject to wear. Flexible members are subject to wear at the contact points and have the potential for fatigue failure.

An improved tilting-pad thrust bearing was developed which uses hydrodynamic pressure generated in a lubricant by the rotation of the journal over the surface of the pad as a source for hydrostatic pressure to support each pad independently. Such a hydrostatically-supported tilting-pad thrust bearing is disclosed in U.S. Pat. No. 3,982,796 to Hill, which teaches applying lubricant to the leading edges of each pad. The thrust bearing disclosed in U.S. Pat. No. 3,982,796 to Hill provides for load equalization through the hydrostatic suspension of individual pads and allows for misalignment accommodation by suspension of the carrier ring using a fraction of the hydrostatic lubricant. While each individual pad is taught to possess respective load equalization ability, there is no teaching of load equalization ability between two or more pads in conjunction. Thus, there remains uneven load equalization on all pads.

With respect to load equalization, mechanical designs of conventional thrust bearings are subject to contact fretting, deformation, and wear, or to fatigue damage. Mechanical designs are further limited in their ability to respond to dynamic changes in relative pad loading. The current use of hydrostatic suspension for the load equalization of tilting-pad thrust bearings is limited to individual pads, which again does not accommodate dynamic changes in relative pad loading. Therefore, what is needed and what has been invented is an improved thrust bearing which does not possess the deficiencies of conventional thrust bearings. More particularly, what is needed and what has been invented is a thrust bearing and method for equalizing load on thrust pads of a thrust bearing.

SUMMARY OF THE INVENTION

Embodiments of the present invention provide a thrust bearing comprising a pad carrier having a pad-carrying surface, a sealing-plate surface, and a carrier structure defining a lubricant manifold, a pressure equalization manifold, at least two pressure equalization passages communicating with and extending from the pressure equalization manifold and terminating in the pad-carrying surface, and at least two lubricant passages communicating with and extending from the lubricant manifold and terminating in the pad-carrying surface. The thrust bearing also comprises at least two thrust pads supported by the pad-carrying surface. Each thrust pad has a pad structure defining a bearing surface and a rear pad surface, at least a portion of which communicates with one of the pressure equalization passages. Each thrust pad also includes a pad passage that extends from the rear pad surface and communicates with the bearing surface, and a lubricant inlet bore that communicates with one of the lubricant passages of the pad carrier.

In another embodiment of the present invention, a thrust bearing assembly is provided having a receptacle containing a lubricant and a thrust bearing immersed in the lubricant. The thrust bearing comprises a pad carrier having a pad-carrying surface, a sealing-plate surface, and a carrier structure defining a pressure equalization manifold, at least two pressure equalization passages communicating with and extending from the pressure equalization manifold and terminating in the pad-carrying surface. At least two thrust pads are supported by the pad-carrying surface. Each thrust pad has a pad structure defining a bearing surface, a rear pad surface with at least a portion of which communicates with one of the pressure equalization passages, and a pad passage extending from the rear pad surface and communicating with the bearing surface.

The rear pad surface of each thrust pad may define a rear pad recess. In one embodiment of the invention, the pad-carrying surface may define a plurality of carrier recesses. The rear pad recess is generally opposed to a pressure equalization passage when each of the thrust pads is supported by the pad-carrying surface. The carrier structure may additionally define a sealing plate recess. A sealing plate is preferably disposed in the sealing plate recess such as to isolate and seal the pressure equalization manifold. A pressure sensor member may be disposed through the sealing plate to indicate a pressure within the pressure equalization manifold.

Embodiments of the present invention further provide a method for equalizing loads between two or more thrust pads of a thrust bearing. The method broadly comprises providing a thrust bearing including at least two thrust pads with each thrust pad having a rear pad surface and supported by a pad carrying surface of a pad carrier; disposing a lubricant on the thrust pads; rotating a bearing element against the thrust pads such that each thrust pad has a different load; and transferring a portion of the lubricant from one volumetric space between one rear pad surface and the pad carrying surface to a volumetric space between another rear pad surface and the pad carrying surface in order to equalize local pressures, and thereby loads between the thrust pads. The method preferably additionally comprises transferring (preferably prior to transferring a portion of the lubricant between volumetric spaces) a portion of the lubricant from a load surface of one thrust pad to a rear pad surface thereof, whereby, due to a different load on each thrust pad, a different pressure develops at the rear pad surface of each rear pad surface. The pad carrier includes a carrier structure defining an equalization manifold, and the transferring of a portion of the lubricant from one volumetric space to another volumetric space comprises passing the portion of the lubricant through an equalization manifold. The method may additionally comprise measuring a pressure of the lubricant within the equalization manifold.

These provisions together with the various ancillary provisions and features which will become apparent to those skilled in the art as the following description proceeds, are attained by the thrust bearing and method of the present invention, preferred embodiments thereof being shown with reference to the accompanying drawings, by way of example only, wherein:

BRIEF DESCRIPTION OF THE DRAWINGS

FIG. 5A is a vertical sectional view taken in direction of the arrows and along the plane of line 5A—5A in FIG. 3;

FIG. 5B is a top plan view of one embodiment of a thrust pad;

FIG. 6 is a vertical sectional view taken in direction of the arrows and along the plane of line 6—6 in FIG. 5B;

FIG. 14 is a vertical sectional view through a schematic of another embodiment of the thrust bearing having each thrust pad with an arcuate or partially-spherical surface generally mating with a corresponding arcuate or partially spherical region in the bottom of the recess of the carrier ring;

FIG. 15 is a partial top plan view of a split carrier ring (i.e., two semi-circular rings), illustrating respective equalization manifolds terminating at both ends in a wall, partition or seal;

FIG. 16 is a partial top plan view of the split carrier ring of FIG. 15 illustrating respective oil inlet manifolds terminating at both ends in a wall, partition or seal;

FIG. 17 is a vertical sectional view through one of the split carrier rings taken in direction of arrows and along the plane of line 17—17 in FIG. 15; and FIG. 18 is a vertical sectional view through one of the split carrier rings taken in direction of the arrows and along the plane of line 18—18 in FIG. 16.

DESCRIPTION OF PREFERRED
EMBODIMENTS OF THE INVENTION

Figure 1:
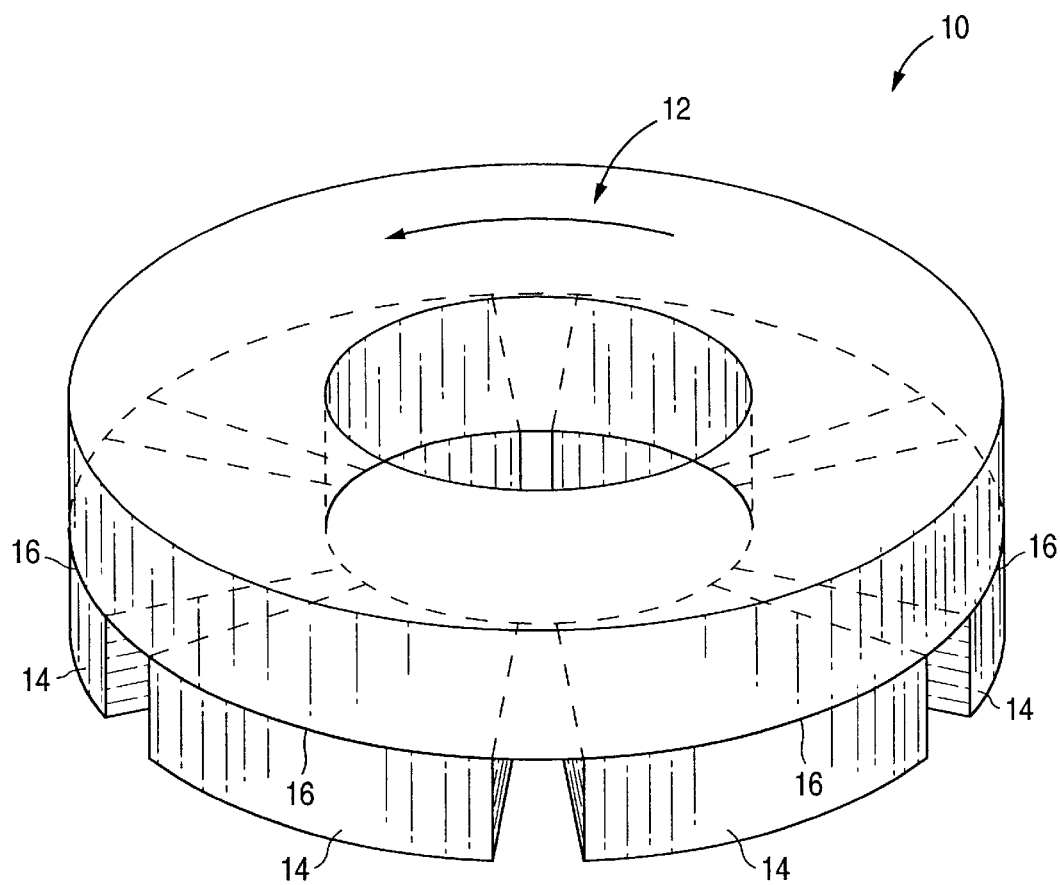
FIG. 1 is a perspective view of a prior art thrust bearing.
Figure 2A:
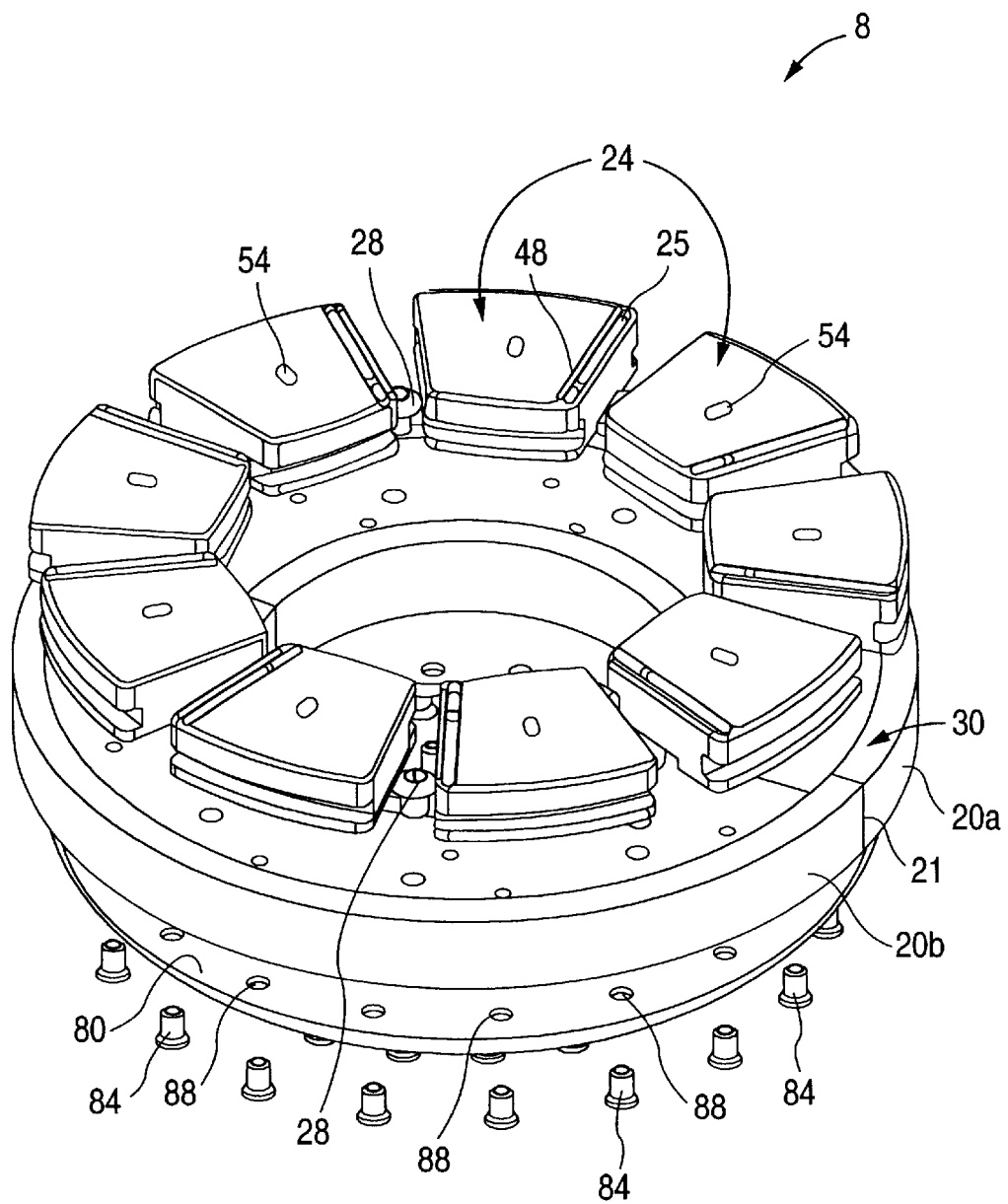
FIG. 2A is a perspective view of an embodiment of the thrust bearing of the present invention.
Figure 2B:
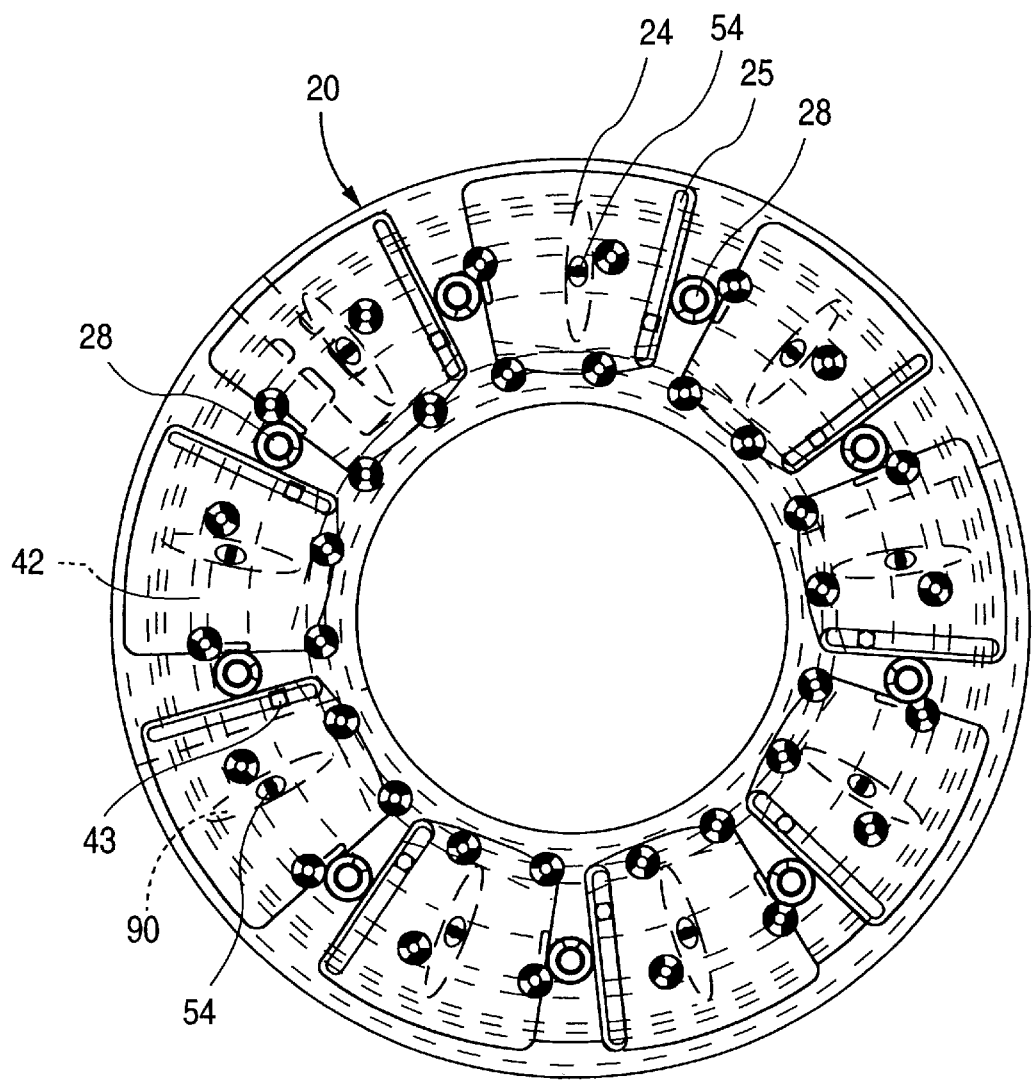
FIG. 2B is a top plan view of an embodiment of the thrust bearing of the present invention.
Figure 3:
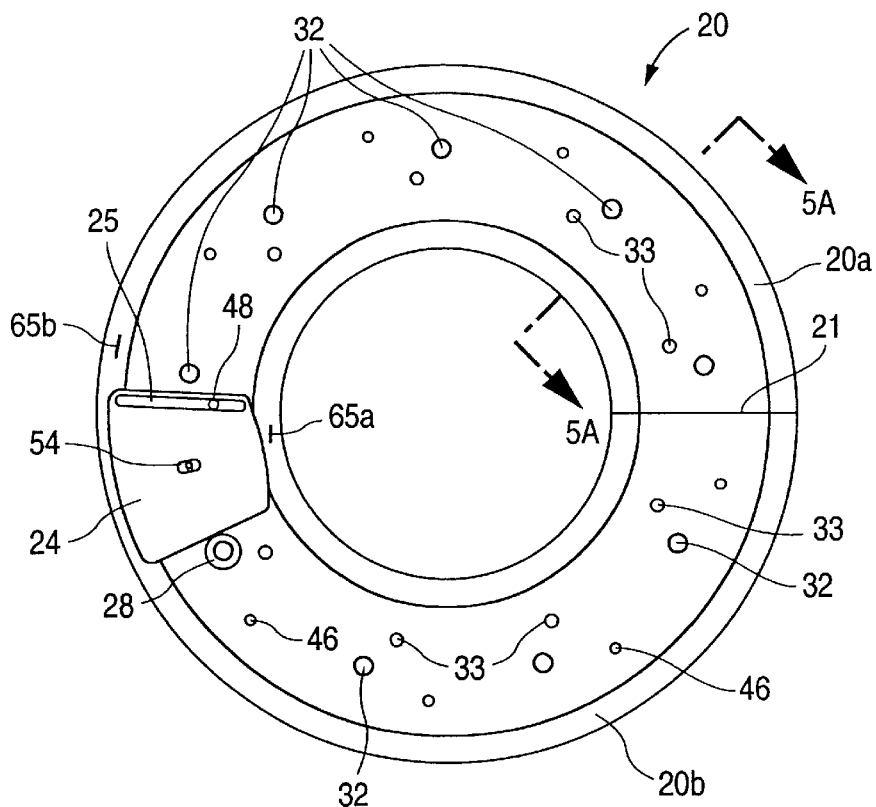
FIG. 3 is a top plan view of an embodiment of the carrier ring having a single thrust pad and a single stop pin engaged thereto.
Figure 4:
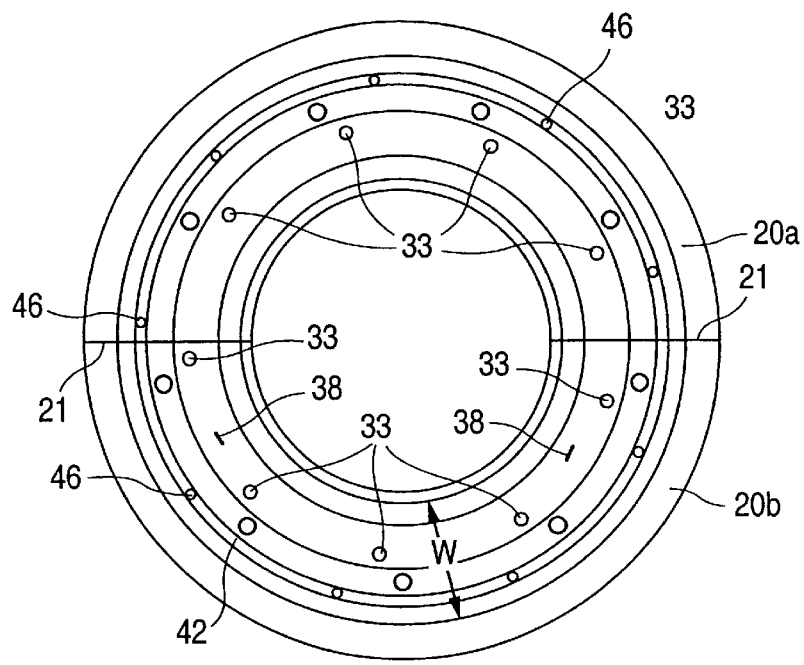
FIG. 4 is a bottom plan view of the carrier ring.
Figure 7:
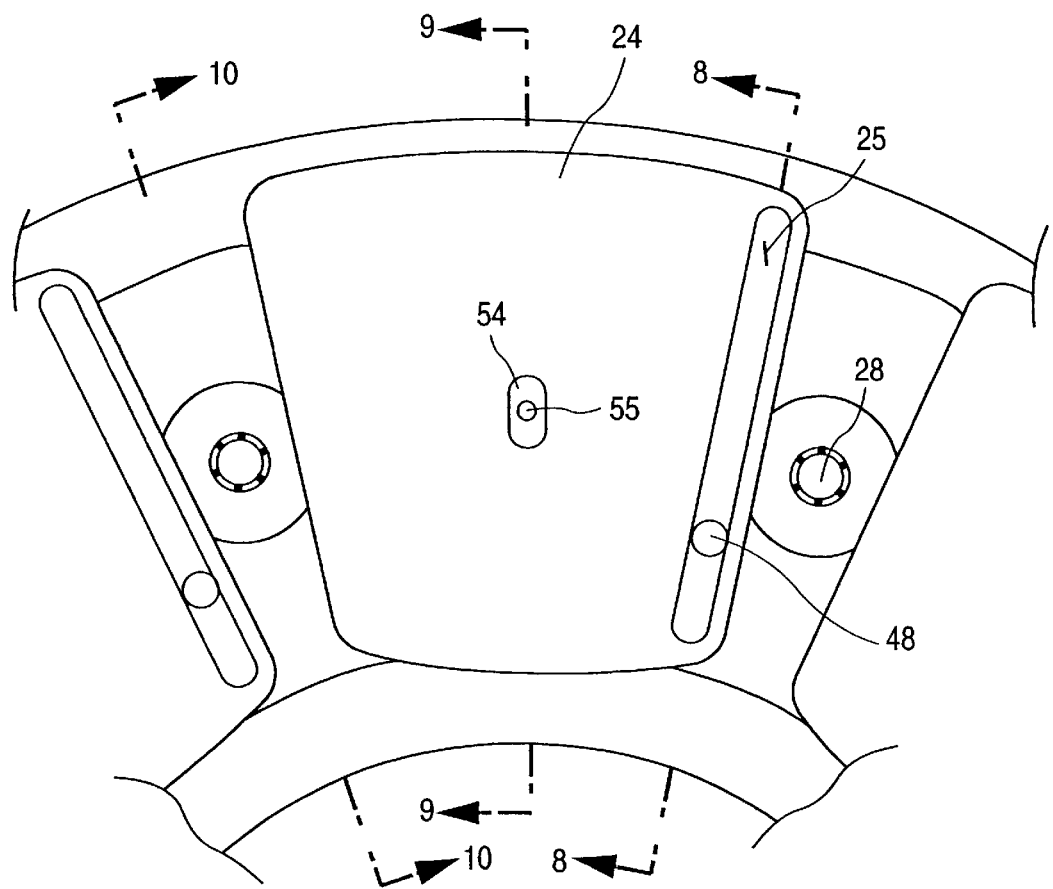
FIG. 7 is an enlarged partial top plan view of one embodiment of a thrust pad engaged to the carrier ring.
Figure 8:
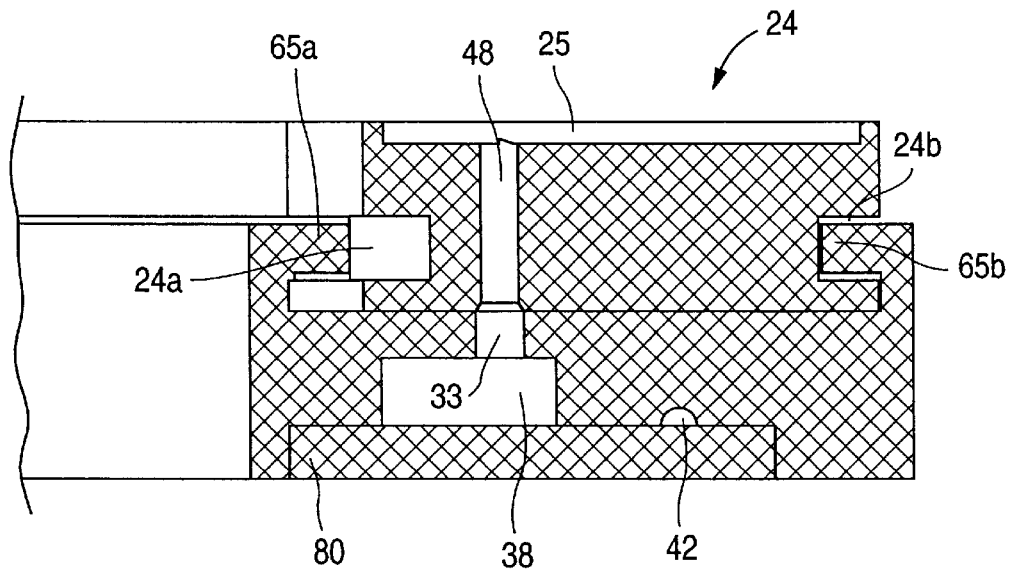
FIG. 8 is a vertical sectional view taken in direction of the arrows and along the plane of line 8—8 in FIG. 7.
Figure 9:
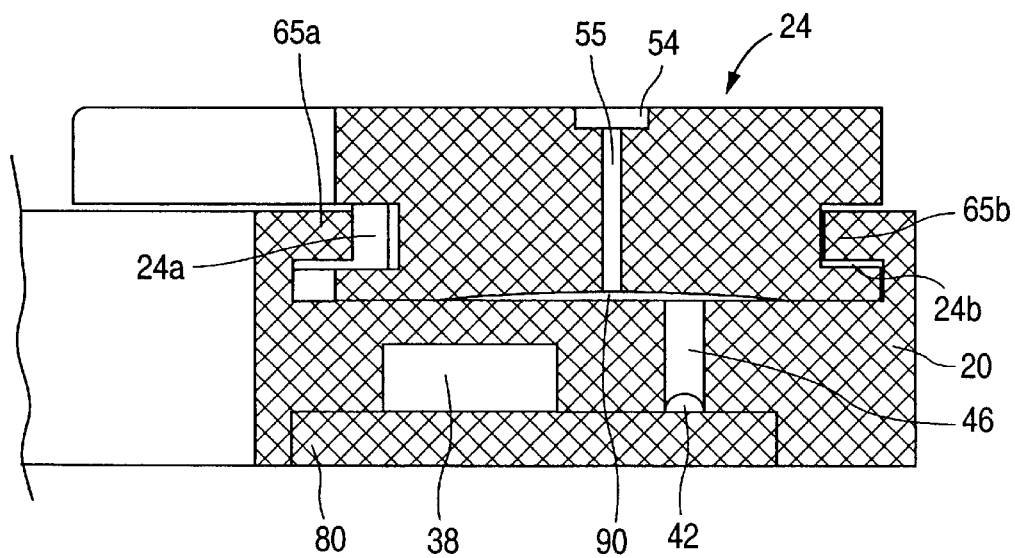
FIG. 9 is a vertical sectional view taken in direction of the arrows and along the plane of line 9—9 in FIG. 7.
Figure 10:
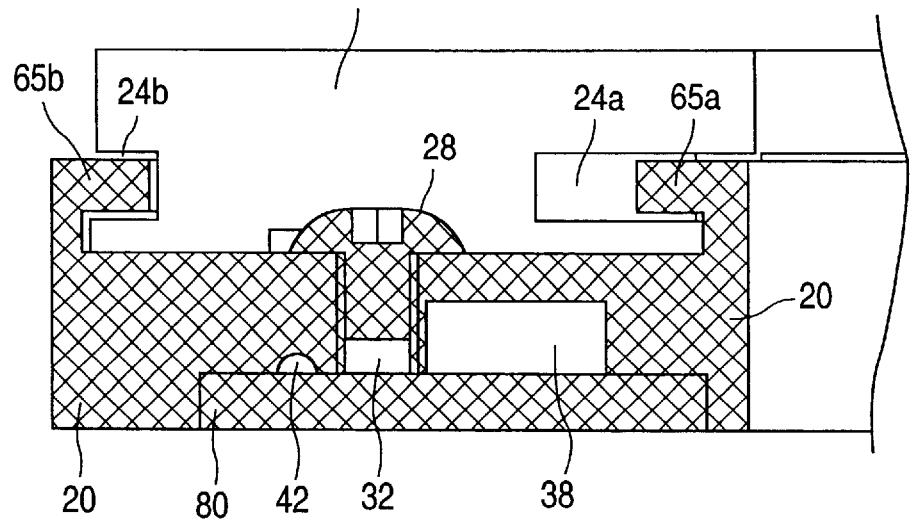
FIG. 10 is a vertical sectional view taken in direction of the arrows and along the plane of line 10—10 in FIG. 7.
Figure 13:
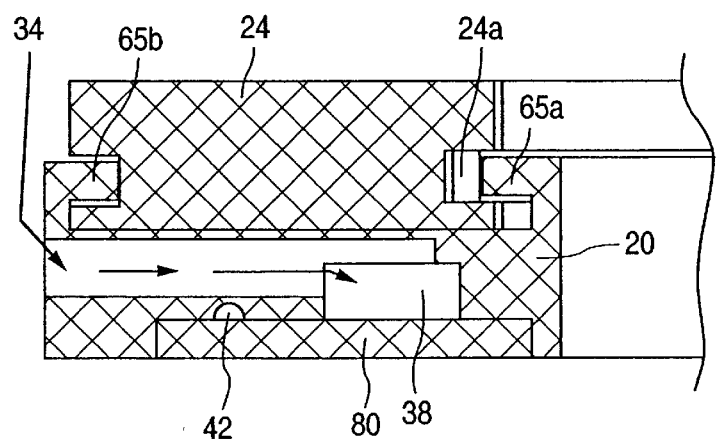
FIG. 13 is a vertical sectional view through a thrust pad and carrier ring disclosing the oil inlet as a bore communicating with the oil inlet manifold.

Referring in detail now to the drawings wherein similar parts of preferred embodiments of the invention are identified by like reference numerals, there is seen a thrust bearing, generally illustrated as 8, including a carrier ring 20 supporting a plurality of thrust pads 24 as best shown in FIG. 2A. Thrust pads 24 are prevented from rotating with the relatively-rotating load surface by an equal plurality of stop pins 28. Stop pins 28 are fixed in a plurality of bores 32 in the carrier ring 20, as best seen in FIGS. 2A, 3 and 10. The carrier ring 20 also includes an oil inlet 34 as best shown in FIG. 13, a plurality of oil equalization passages 46, an equalization manifold 42 (e.g., a semi-circular groove in vertical cross-section as best seen in FIG. 5A and FIG. 9) communicating with the plurality of oil equalization passages 46 by respective oil equalization passages 46 terminating in the equalization manifold 42, an oil inlet manifold 38 (e.g., a parallelogramic channel in vertical cross-section, as best shown in FIG. 5A) communicating with the oil inlet 34, and a plurality of oil passageways 33 communicating with the oil inlet manifold 38 by terminating therein. The carrier ring 20 also includes a sealing-plate recess 68 wherein a sealing plate 80 lodges. This is accomplished in one embodiment with pins 84 (see FIGS. 2A, 4 and 5A). The sealing-plate recess 68 has a width W. In this embodiment, the carrier ring 20 includes a pad recess 64 wherein the plurality of thrust pads 24 lodge. The pad recess 64 includes a bottom 64a and a pair of opposed pad lips 65a–65b which lodge respectively in opposed channels 24a–24b of the thrust pads 24, as best shown in FIGS. 8 and 9.

Figure 12:
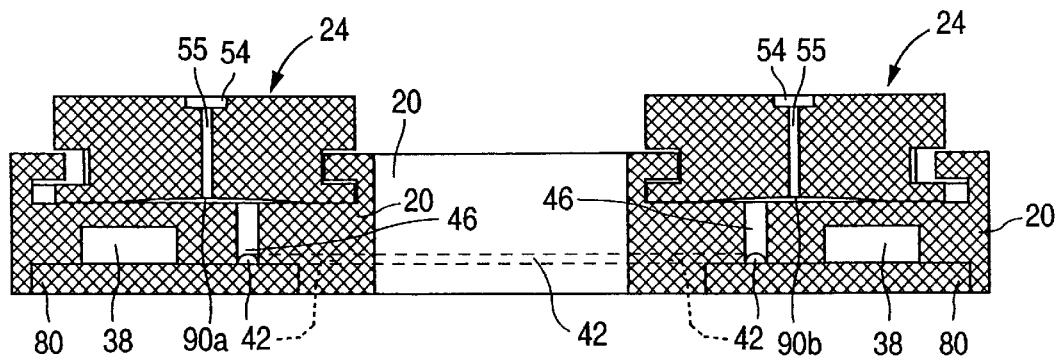
FIG. 12 is a schematic view of two thrust pads communicating with the common equalization manifold to equalize the oil pressure between respective rear pad surfaces (e.g., rear pad recesses) of the two thrust pads.

Each thrust pad 24, in addition to opposed channels 24a–24b, includes an oil inlet bore 48 (see FIG. 3) terminating in a groove 25, and a rear pad recess 90 communicating with a hydrostatic port 54 via a pad passage 55. As best shown in FIG. 8, each oil inlet bore 48 is in communication with an oil passageway 33 of the carrier ring 20 such that oil may pass from the oil inlet manifold 38, through the respective oil passageways 33, into and through the respective oil inlet bores 48, and into the respective grooves 25. Each equalization passage 46 of the carrier ring 20 communicates with respective pad recess 90 such that the fluid or oil pressure on the back (i.e., pressure in the pad recess 90) of each thrust pad 24 is equalized among all of the pad recesses 90 via each equalization passage 46 communicating with the equalization manifold 42. Stated alternatively, because the equalization manifold 42 communicates with each equalization passage 46, and because respective equalization passages 46 communicates with respective pad recesses 90, pressure in and among the pad recesses 90 are equalized through respective equalization passages 46 and the equalization manifold 42 which is common to all equalization passages 46. Referring now to FIG. 12 by way of further exemplification, assuming higher pressure in rear pad recess 90a than in rear pad recess 90b due to different or unequal loads on the thrust pads 24—24 respectively associated with rear pad recess 90a and 90b, oil/lubricant will flow (due to oil/lubricant pressure differential caused by the unequal loads) from pad recess 90a, through the equalization passage 46 associated with pad recess 90a, through equalization manifold 42 and into the pad recess 90b via the equalization passage 46 associated with pad recess 90b.

The oil inlet 34 connects to a lubricant or oil supply (not shown) and delivers the lubricant to the inlet manifold 38, which is isolated from the environment and the equalization manifold 42. Under the supply pressure, lubricant or oil from the inlet manifold 38 passes through the oil passageway 33 in the carrier ring 20 to the back side of each pad 24 at the mating oil inlet passage 48 in such thrust pad 24. As previously indicated, oil inlet passage 48 allows lubricant to flow into the groove 25 which distributes lubricant/oil along the leading edge of each thrust pad 24. Due to the relative rotation of any load surface against the thrust pads 24, and the sliding or tilting action of each thrust pad 24, hydrodynamic pressure well in excess of the lubricant supply pressure develops in the lubricant/oil as it is carried along the narrowing gap between any relatively-rotating load surface and the bearing surface of each thrust pad 24. Under the hydrodynamic pressure developed on the bearing surface, a portion of the lubricant/oil flow, as a secondary lubricant flow, through the hydrostatic port 54 and through the pad passage 55 to the pad recess 90 or the back of each thrust pad 24.

The secondary lubricant flow of the lubricant/oil pressurizes the conforming space between the back of each thrust pad 24 and the carrier ring 20. The rear pad recess 90 on the back of each thrust pad 24 helps to distribute the pressurized lubricant/oil. This pressurization on the back of each thrust pad 24 lifts each thrust pad 24 away from the carrier ring 20, more specifically away from bottom 64a. The design of the contact geometry between each thrust pad 24 and its corresponding stop pin 28 readily allows the trailing edge of each thrust pad 24 to lift away from the carrier ring 20. In the embodiment of the thrust bearing 8 in FIG. 11, the carrier ring 20 (i.e., the bottom 64a of the pad recess 64) includes a plurality of carrier recesses 91, each of which mate opposedly with a hydrostatic port passage 55 or rear pad recess 90 of a thrust pad 24. Lubricant/oil is capable of flowing through hydrostatic port 54 and through pad passage 55, causing respective thrust pads 24 to lift slightly upwardly and away from the bottom 64a of the recess 64 and occupy any space resulting from the separation.

The pressure developed at or on the back of each thrust pad 24 is able to communicate with the equalization manifold 42 in the carrier ring 20 by means of the plurality of equalization passages 46. By allowing for slight lubricant/oil flow within this manifold 42, the pressure within the equalization manifold 42 becomes the average pressure at or on the back of all the thrust pads 24. Individual thrust pads 24 which develop a pressurization slightly above the average will generate lubricant/oil flow from respective associated rear pad recesses 90, through respective associated equalization passages 46, and into the equalization manifold 42, all of which will result in a reduction of pressure. Individual thrust pads 24 which develop a pressurization slightly below the average will receive flow out of the equalization manifold 42. These tertiary flows provide for the load equalization between or among thrust pads 24 for the various embodiments of the present invention.

Each thrust pad 24 is constrained against radial movement by the pad lips 65a–65b. The sealing plate 80 fits within the sealing plate recess 68 on the carrier ring 20 to separate the oil inlet manifold 38 from the equalization manifold 42. The carrier ring 20 may be a full annulus, or a split annulus defined by semi-annulus sections 20a and 20b. When split, sealed connections for the oil inlet manifold 38 and the equalization manifold 42 are made across the split line 21. Each split annulus would have an associated oil inlet 34. As best shown in FIGS. 15–18, in the split annulus embodiment wherein the carrier ring 20 includes semi-annulus sections 20a and 20b, the equalizations manifold 42 and the oil inlet manifold 38 is respectively split into semi-circular equalization manifold 42a and 42b and semi-circular oil inlet manifolds 38a and 38b. The semi-circular equalization manifolds 42a and 42b terminate at opposed ends in a wall or seal 42c. Similarly, the semi-circular oil inlet manifolds 38a and 38b terminate at opposed ends in a wall or seal 38c. Thus, there is sealing of the equalization manifolds 42a and 42b and oil inlet manifolds 38a and 38b generally across the split line 21.

A pressure sensor 71, as best shown in FIG. 5A, may be mounted in the sealing plate 80 in line with the equalization manifold 42 to record the pressure within the equalization manifold 42. As previously indicated, FIGS. 5A and 6 illustrate a flat surface on the back 24c of each thrust pad 24 and a corresponding flat surface or bottom 64a of the carrier ring 20. Alternatively, and as further previously indicated, the back 24c of each thrust pad 24 may have a partially-spherical surface with a plurality of corresponding partially-spherical mating regions on the bottom 64a of the recess 64 of the carrier ring 20, as best shown in FIG. 14.

Figure 11:
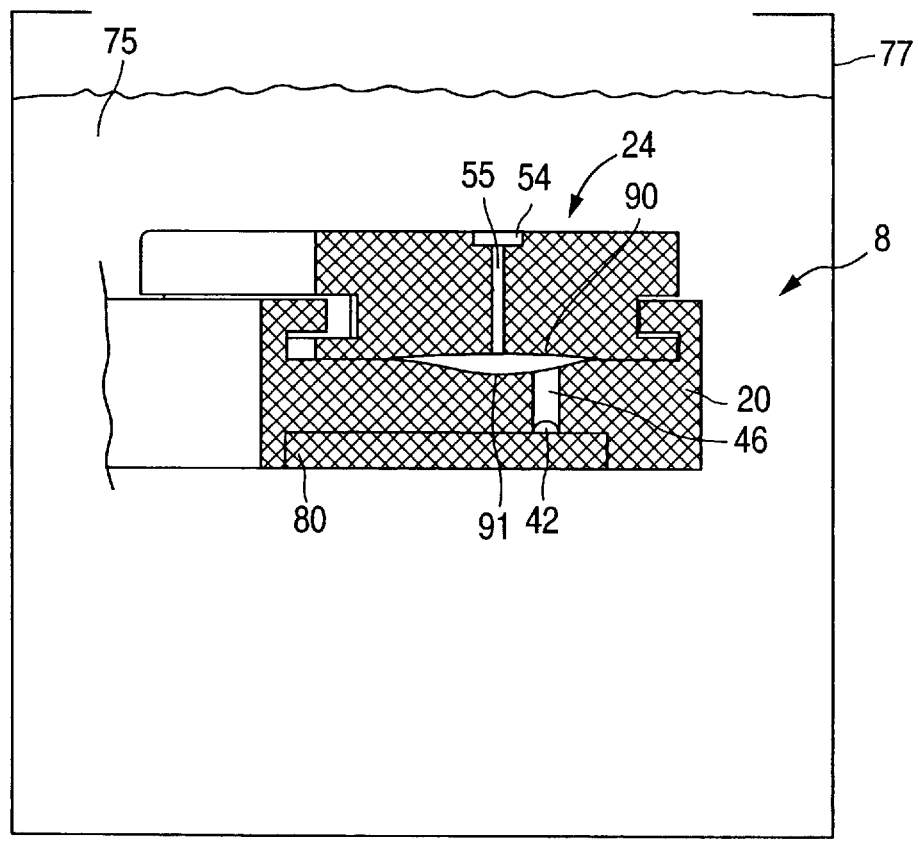
FIG. 11 is a vertical sectional view through a schematic of another embodiment of the thrust bearing not having an oil inlet manifold and groove, or any of the passageways (e.g., oil inlet bores and oil passageways) between the oil inlet manifold and the groove, and immersed in a container of oil for operably rotating therein.

In another embodiment of the invention as illustrated in FIG. 11, the thrust bearing 8 is immersed in oil 75 confined within a receptacle or container 77. This embodiment of the invention does not have the oil inlet manifold 38 in the carrier ring 20, as lubrication is provided by the surrounding oil 75. The carrier ring 20 for this embodiment of the invention also does not have any oil passageways 33. The thrust pads 24 do not possess any oil inlet bores 48 or any grooves 25, as these elements are not needed. This embodiment of the invention does however include the carrier ring 20 having the equalization manifold 42 and inlet passages 46, as well as each thrust pad 24 having a pad passage 55 and a hydrostatic port 54, all for equalizing loads on and among respective thrust pads 24 as a loading surface rotates against the thrust pads 24 while immersed in the oil 75.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope and spirit of the invention as set forth. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A thrust bearing comprising:
   (a) a carrier having at least one pad recess, an oil inlet manifold within the carrier, and a pressure equalization manifold within the carrier; and
   (b) a plurality of thrust pads disposed in the pad recess, each thrust pad having a bearing face, a rear face having a rear pad recess therein, an oil inlet bore, and a pad passage, the oil inlet bore and the pad passage defining two separate fluid communication paths between the bearing face and the rear face of each pad;
   (c) wherein the oil inlet manifold in the carrier is in fluid communication with each of the oil inlet bores of the thrust pads to define a first plurality of oil supply paths for supplying oil to the bearing faces, the pad passages provide a second plurality of oil supply paths for supplying oil from the bearing faces to the rear pad recesses of the thrust pads, and wherein the pressure equalization manifold in the carrier is in fluid communication with each of the rear pad recesses, thereby providing automatic pressure equalization between the rear pad recesses.

2. A thrust bearing according to claim 1 wherein the thrust pads are at least partially captured in the pad recess by a plurality of stop pins.

3. A thrust bearing according to claim 1 wherein the carrier ring includes at least one pad lip, and each thrust pad includes at least one channel, wherein the pad lip is at least partially received in the channel of each thrust pad such that the thrust pads are at least partially captured in the pad recess by the pad lip.

4. A thrust bearing according to claim 1 wherein the carrier includes a first pad lip and an opposed second pad lip, and each thrust pad includes a first channel and an opposed second channel, wherein the first pad lip is at least partially received in the first channel and the second pad lip is at least partially received in the second channel of each thrust pad such that the thrust pads are at least partially captured in the pad recess by the pad lips.

5. A thrust bearing according to claim 1 and further comprising at least one pressure sensor for detecting the pressure in the pressure equalization manifold.

6. A thrust bearing according to claim 1 wherein the rear face of each thrust pad includes a spherical portion.

7. A thrust bearing according to claim 1 wherein the carrier is a carrier ring.

8. A load-equalizing thrust bearing comprising:
   (a) a carrier ring having a thrust pad recess;
   (b) a plurality of thrust pads loosely captured in the thrust pad recess, each thrust pad having a bearing face, and each thrust pad having a rear face and a rear pad recess therein, wherein the rear pad recess is positioned between the pad and thrust pad recess;
   (c) means for supplying oil to the bearing faces of the thrust pads;
   (d) means for permitting oil to pass from the faces of the thrust pads to the rear pad recesses; and
   (e) a pressure equalization conduit within the carrier ring, the pressure equalization conduit being in fluid communication with each of the rear pad recesses such that the rear pad recesses are in fluid communication with each other.

9. A thrust bearing according to claim 8 wherein the means for supplying oil to the bearing faces of the thrust pads comprises:
   (a) an oil supply conduit within the carrier ring;
   (b) a plurality of oil supply bores extending between the thrust pad recess and oil supply conduit; and
   (c) at least one oil inlet bore in each thrust pad extending between the rear face and the bearing face;
   (d) wherein oil supplied to the oil supply conduit is directed through the oil supply bores in the carrier ring and through the oil inlet bore in each thrust pad to the bearing faces of the thrust pads.

10. A thrust bearing according to claim 9 wherein the bearing face of each thrust pad includes at least one oil supply groove therein, and the oil inlet bore in each thrust pad extends from the rear face to the oil supply groove.

11. A thrust bearing according to claim 8 wherein the means for permitting oil to pass from the faces of the thrust pads to the rears pad recesses includes at least one pad passage in each thrust pad, the pad passage extending between the bearing face and the rear pad recess of the pad.

12. A thrust bearing according to claim 11 wherein each thrust pad includes a pad passage that is proximate to the center of the thrust pad.

13. A thrust bearing according to claim 8 wherein the plurality of thrust pads are at least partially captured in the thrust pad recess by a plurality of pins.

14. A thrust bearing according to claim 8 wherein each thrust pad includes at least one channel along at least one edge of the thrust pad, and the carrier ring includes at least one lip configured to be received in the at least one channel, whereby the lip and channel cooperate to at least partially capture the thrust pads in the thrust pad recess.

15. A thrust bearing according to claim 8 and further comprising at least one pressure sensor for detecting pressure in the pressure equalization conduit.

16. A thrust pad bearing according to claim 8 wherein the rear face of each thrust pad includes a spherical portion.

17. A thrust bearing for supporting a rotating face of a rotating apparatus, the thrust bearing comprising a plurality of tiltable thrust pads disposed in a pad recess in a carrier ring, each pad having a bearing face, a rear face, and being supported on a volume of oil positioned between the pad and the pad recess, and a pressure equalization conduit positioned within the carrier ring that fluidly connects each of the volumes of oil supporting the thrust pads, wherein the pressure equalization conduit causes the pressure of each volume of oil to automatically be regulated at substantially equal pressures without pumps, valves, external oil conduits, or other intervening mechanical devices.

18. A thrust pad bearing according to claim 17 wherein the carrier ring further includes an oil inlet passageway within the carrier ring that is in fluid communication with the bearing face of each thrust pad, whereby oil supplied to the oil inlet passageway is delivered to the bearing faces of the thrust pads.

19. A thrust pad bearing according to claim 17 wherein each thrust pad further includes a pad passage extending from the bearing face to the rear face, whereby oil is supplied from the bearing face to the volume of oil underlying the thrust pad.

20. A thrust pad bearing according to claim 17 wherein there is no direct mechanical connection between each thrust pad and the carrier ring.

21. A thrust pad bearing according to claim 20 wherein the thrust pads are at least partially captured in the pad recess of the carrier ring by a plurality of stop pins.

22. A thrust pad bearing according to claim 20 wherein each thrust pad includes at least channel along at least one edge of the pad and wherein the carrier ring includes at least one lip configured to be received in the channel of each thrust pad, wherein the lip at least partially captures each thrust pad in the pad recess.

23. A thrust pad bearing according to claim 17 wherein the rear face of each thrust pad includes a spherical portion.

24. A thrust pad bearing according to claim 17 and further comprising at least one pressure sensor for detecting pressure in the pressure equalization conduit.

* * * * *